United States Patent
Lee et al.

(10) Patent No.: US 9,443,291 B2
(45) Date of Patent: Sep. 13, 2016

(54) METHODS FOR LENS CALIBRATION AND IMAGE RESTORATION

(71) Applicant: Samsung Electronics Co., Ltd., Suwon-si, Gyeonggi-do (KR)

(72) Inventors: Hyung Gu Lee, Suwon-si (KR); Tae Chan Kim, Yongin-si (KR); Joonki Paik, Seoul (KR); Donggyun Kim, Seoul (KR); Seonyung Kim, Seoul (KR)

(73) Assignees: Samsung Electronics Co., Ltd., Suwon-si, Gyeonggi-do (KR); Chung Ang University Industry Academy Cooperation Foundation, Seoul (KR)

( * ) Notice: Subject to any disclaimer, the term of this patent is extended or adjusted under 35 U.S.C. 154(b) by 386 days.

(21) Appl. No.: 13/950,586

(22) Filed: Jul. 25, 2013

(65) Prior Publication Data

US 2014/0375845 A1 Dec. 25, 2014

(30) Foreign Application Priority Data

Jun. 20, 2013 (KR) ........................ 10-2013-0071260

(51) Int. Cl.
G06K 9/40 (2006.01)
G06T 5/00 (2006.01)

(52) U.S. Cl.
CPC ............... *G06T 5/003* (2013.01); *G06T 5/006* (2013.01)

(58) Field of Classification Search
USPC ........................................................ 382/254
See application file for complete search history.

(56) References Cited

U.S. PATENT DOCUMENTS

| 7,443,597 | B2 | 10/2008 | Humpston | |
|---|---|---|---|---|
| 2002/0057345 | A1* | 5/2002 | Tamaki | H04N 5/217 348/207.99 |
| 2009/0180008 | A1* | 7/2009 | Williams | G06T 7/0018 348/241 |
| 2014/0307128 | A1* | 10/2014 | Lai | G06T 5/006 348/240.99 |

OTHER PUBLICATIONS

A. Katsaggelos, "Iterative Image Restoration Algorithms," Optical Engineering, vol. 28, No. 7, pp. 735-748, Jul. 1989.
S. Shah, et al., "Intrinsic parameter calibration procedure for a (high distortion) fish-eye lens camera with distortion model and accuracy estimation" Journal of Pattern Recognition, vol. 29, No. 11, pp. 1775-1788, Feb. 1996.
H. Bakstein et al., "Panoramic mosaicing with a 180° field of view lens," IEEE Workshop on Omnidirectional Vision, pp. 60-67, Dec. 2002.
Z. Zhang et al., "A flexible new technique for camera calibration," IEEE Trans. Pattern Analysis and Machine Intelligence, vol. 22, No. 11, pp. 1330-1334, Nov. 2000.
J. Park, et al., "Lens distortion correction using ideal image coordinates," IEEE Trans. Consumer Electronics, vol. 55, No. 3, pp. 987-991, Aug. 2009.

* cited by examiner

*Primary Examiner* — Yon Couso
(74) *Attorney, Agent, or Firm* — Harness, Dickey & Pierce

(57) ABSTRACT

In one example embodiment, a lens calibration method includes generating a distorted image by distorting a pattern image that includes at least two reference points separated from a center of the pattern image by different distances. The method further includes generating lens calibration data by comparing the pattern image with the distorted image.

15 Claims, 16 Drawing Sheets

Distortion of Filter

METHODS FOR LENS CALIBRATION AND IMAGE RESTORATION

CROSS-REFERENCE TO RELATED APPLICATIONS

This application claims priority under 35 U.S.C. §119(a) from Korean Patent Application No. 10-2013-0071260 filed on Jun. 20, 2013, the disclosure of which is hereby incorporated by reference in its entirety.

BACKGROUND

Embodiments of inventive concepts relate to a lens calibration method and an image restoration method.

A wide-angle lens has a shorter focal length than a standard lens. The wide-angle lens exaggerates perspective and increases the depth of focus and is thus used in various applications.

An image captured by a wide-angle lens includes geometric distortion. When the geometric distortion is removed from the image, resolution decreases at the periphery of the image, causing a blur.

Meanwhile, data indicating how much the image is distorted by the lens is necessary to correct the image. A process of obtaining the data is called lens calibration. When a grid pattern is used in the lens calibration, the distances between a reference point (e.g., the center of the image) and grid points may be the same as each other, which decreases the accuracy of the calibration and increases the amount of computation.

SUMMARY

Some example embodiments provide a lens calibration method for decreasing the amount of computation and/or increasing the accuracy of lens calibration. Furthermore, some embodiments provide an image restoration method for increasing the picture quality of images.

According to an example embodiment of inventive concepts, a lens calibration method includes generating a distorted image by distorting a pattern image that includes at least two reference points separated from a center of the pattern image by different distances. The method further includes generating lens calibration data by comparing the pattern image with the distorted image.

In yet another example embodiment, the pattern image is a spiral pattern image.

In yet another example embodiment, the distorted image includes a plurality of distortion masks and the generating the lens calibration data includes calculating a coordinate of each of at least two distortion points corresponding to the at least two reference points, respectively, using the distortion masks. The generating the lens calibration data further includes calculating a ratio between a distance between the center of the pattern image and the coordinate of each of the at least two reference points and a distance between a center of the distorted image and a corresponding coordinate of one of the at least two distortion points.

In yet another example embodiment, the calculating the coordinate of each of the at least two distortion points includes calculating a weighted average of coordinates of a plurality of pixels in a corresponding one of the distortion masks based on brightness values of the plurality of pixels.

In yet another example embodiment, the generating the distorted image is performed using a lens simulator.

In yet another example embodiment, the lens calibration method is performed by at least one of a personal computer, a data server, a laptop computer, a portable device, and an image processor.

an example embodiment of inventive concepts a non-transitory computer readable including a computer program product is disclosed. The computer program product includes instructions, which when executed by a processor, causes the processor to perform the lens calibration method of generating the distorted image and generating the lens calibration data, described above.

According to one example embodiment of inventive concepts, an image restoration method includes generating a degraded image by degrading an input image using lens calibration data, generating a deducted image according to a result of subtracting the degraded image from the input image, and adjusting the input image based on the deducted image.

In one example embodiment, the image restoration method further includes repeatedly performing the generating the degraded image, the generating the deducted image, and the adjusting the input image until the adjusted input image satisfies a desired condition.

In one example embodiment, the generating the degraded image includes generating a distorted image by distorting the input image using the lens calibration data and generating the degraded image by compensating the distorted image.

In one example embodiment, the generating the distorted image is performed using a raised cosine filter.

In one example embodiment, the raised cosine filter has a function $$H(\rho) = \begin{cases} T', & |\rho'| \leq \frac{1-\beta}{2T'} \\ \frac{T'}{2}\left[1 + \cos\left(\frac{\pi T'}{\beta}\left[|\rho'| - \frac{1-\beta}{2T'}\right]\right)\right], & \frac{1-\beta}{2T'} < |\rho'| \leq \frac{1+\beta}{2T'}, \\ 0, & \text{otherwise} \end{cases}$$

where $T'=T\cdot\alpha(\rho)$ and $\rho'=\rho\cdot\alpha(\rho)$, $T$ is a radius of the raised cosine filter, $\rho$ is a distance from a center of the input image, $\alpha$ is the lens calibration data, and $\beta$ is a desired value ranging from 0 to 1.

In one example embodiment, the generating the deducted image includes generating a filtered image by performing a Laplacian filtering of the input image, subtracting the degraded image and the filtered image from the input image and generating the deducted image by scaling a result of the subtracting the degraded image and the filtered image from the input image.

In one example embodiment, the lens calibration data is generated by distorting a spiral pattern image and comparing the spiral pattern image with the distorted image.

In yet another example embodiment, the input image is an image that is captured through a fisheye lens and is geometrically compensated.

In one example embodiment, a method includes generating a lens calibration data based on comparing a pattern image and a distorted image of the pattern image. The method further includes generating a degraded image based on an input image and the lens calibration data, generating a deducted image using the degraded image and the input image, adjusting the input image based on the deducted image and determining whether the adjusted input image satisfied a desired condition.

In yet another example embodiment, the pattern image is a first spiral pattern image comprising at least two reference points and the distorted image is a second spiral pattern comprising at least two distortion points, each of the at least two distortion points corresponding to one of the at least two reference points. In yet another example embodiment, the comparing includes calculating a ratio between a first distance and a second distance, the first distance being a distance between a center of the pattern image and a corresponding coordinate of the at least two reference points and the second distance being a distance between a center of the distorted image and a corresponding coordinate of one of the at least two distortion points.

In yet another example embodiment, the generating the degraded image includes distorting the input image using the lens calibration data and compensating the distorted image using an interpolation method.

In yet another example embodiment, the generating the deducted image includes generating a filtered image by performing a Laplacian filtering of the input image, subtracting the degraded image and the filtered image from the input image and generating the deducted image by scaling a result of the subtracting the degraded image and the filtered image from the input image.

In yet another example embodiment, the adjusting includes subtracting the deducted image from the input image.

In yet another example embodiment, the desired condition is a convergence of the adjusted input image to the input image.

BRIEF DESCRIPTION OF THE DRAWINGS

The above and other features and advantages of inventive concepts will become more apparent by describing in detail exemplary embodiments thereof with reference to the attached drawings in which.

DETAILED DESCRIPTION OF EXAMPLE EMBODIMENTS

Figure 1:
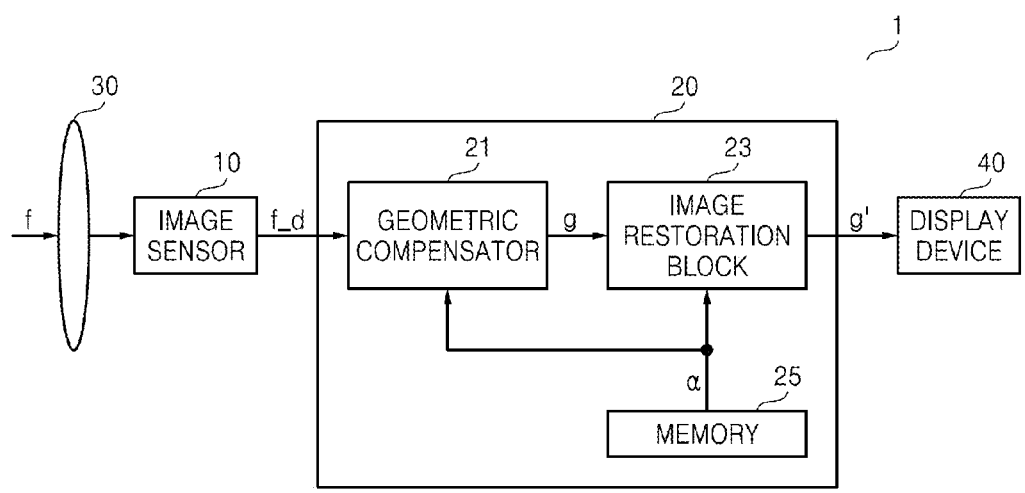
FIG. 1 is a block diagram of an image processing apparatus, according to an example embodiment of inventive concepts.

Inventive concepts now will be described more fully hereinafter with reference to the accompanying drawings. Like elements on the drawings are labeled by like reference numerals.

Detailed illustrative embodiments are disclosed herein. However, specific structural and functional details disclosed herein are merely representative for purposes of describing example embodiments. This invention may, however, be embodied in many alternate forms and should not be construed as limited to only the embodiments set forth herein.

Accordingly, while example embodiments are capable of various modifications and alternative forms, the embodiments are shown by way of example in the drawings and will be described herein in detail. It should be understood, however, that there is no intent to limit example embodiments to the particular forms disclosed. On the contrary, example embodiments are to cover all modifications, equivalents, and alternatives falling within the scope of this disclosure. Like numbers refer to like elements throughout the description of the figures.

Although the terms first, second, etc. may be used herein to describe various elements, these elements should not be limited by these terms. These terms are only used to distinguish one element from another. For example, a first element could be termed a second element, and similarly, a second element could be termed a first element, without departing from the scope of this disclosure. As used herein, the term "and/or," includes any and all combinations of one or more of the associated listed items.

When an element is referred to as being "connected," or "coupled," to another element, it can be directly connected or coupled to the other element or intervening elements may be present. By contrast, when an element is referred to as being "directly connected," or "directly coupled," to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting. As used herein, the singular forms "a", "an", and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Specific details are provided in the following description to provide a thorough understanding of example embodiments. However, it will be understood by one of ordinary skill in the art that example embodiments may be practiced without these specific details. For example, systems may be shown in block diagrams so as not to obscure the example embodiments in unnecessary detail. In other instances, well-known processes, structures and techniques may be shown without unnecessary detail in order to avoid obscuring example embodiments.

In the following description, illustrative embodiments will be described with reference to acts and symbolic representations of operations (e.g., in the form of flow charts, flow diagrams, data flow diagrams, structure diagrams, block diagrams, etc.) that may be implemented as program modules or functional processes include routines, programs, objects, components, data structures, etc., that perform particular tasks or implement particular abstract data types and may be implemented using existing hardware at existing network elements. Such existing hardware may include one or more Central Processing Units (CPUs), digital signal processors (DSPs), application-specific-integrated-circuits, field programmable gate arrays (FPGAs), computers or the like.

Although a flow chart may describe the operations as a sequential process, many of the operations may be performed in parallel, concurrently or simultaneously. In addition, the order of the operations may be re-arranged. A process may be terminated when its operations are completed, but may also have additional steps not included in the figure. A process may correspond to a method, function, procedure, subroutine, subprogram, etc. When a process corresponds to a function, its termination may correspond to a return of the function to the calling function or the main function.

As disclosed herein, the term "storage medium" or "computer readable storage medium" may represent one or more devices for storing data, including read only memory (ROM), random access memory (RAM), magnetic RAM, core memory, magnetic disk storage mediums, optical storage mediums, flash memory devices and/or other tangible machine readable mediums for storing information. The term "computer-readable medium" may include, but is not limited to, portable or fixed storage devices, optical storage devices, and various other mediums capable of storing, containing or carrying instruction(s) and/or data.

Furthermore, example embodiments may be implemented by hardware, software, firmware, middleware, microcode, hardware description languages, or any combination thereof. When implemented in software, firmware, middleware, or microcode, the program code or code segments to perform the necessary tasks may be stored in a machine or computer readable medium such as a computer readable storage medium. When implemented in software, a processor or processors will perform the necessary tasks.

A code segment may represent a procedure, function, subprogram, program, routine, subroutine, module, software package, class, or any combination of instructions, data structures or program statements. A code segment may be coupled to another code segment or a hardware circuit by passing and/or receiving information, data, arguments, parameters or memory contents. Information, arguments, parameters, data, etc. may be passed, forwarded, or transmitted via any suitable means including memory sharing, message passing, token passing, network transmission, etc.

FIG. 1 is a block diagram of an image processing apparatus 1 according to an example embodiment of inventive concepts. The image processing apparatus 1 may include an image sensor 10, an image processor 20, a lens 30, and a display device 40.

The lens 30 transmits an image "f" to the image sensor 10. The lens 30 may be a wide-angle lens or a fisheye lens, but inventive concepts are not restricted to the example embodiments.

The image sensor 10 may convert an image distorted by the lens 30 into an electrical signal, i.e., an image signal f_d and output the image signal f_d to the image processor 20. The image sensor 10 may be any one of a complementary metal-oxide-semiconductor (CMOS) image sensor and a charge-coupled device (CCD) image sensor, but inventive concepts are not restricted to the example embodiments.

The image processor 20 may generate a restoration signal g' by processing the image signal f_d and output the restoration signal g' to the display device 40.

In one example embodiment, the image processing apparatus 1 does not include the image processor 20. Accordingly, the processing of the image signal f_d may be performed by the image sensor 10 instead of the image processor 20.

The image processor 20 may control the image sensor 10 using, for example, an inter-integrated circuit ($I^2C$), but inventive concepts are not restricted to such example. The image processor 20 may include a geometric compensator 21 and an image restoration block 23. The image processor 20 may also include a memory 25, but inventive concepts are not restricted to the example embodiments. In one example embodiment, the memory 25 may be a separate unit from the image processor 20 and in connection with the image processor via a known and/or to be developed wired and/or wireless connection line.

The geometric compensator 21 may generate and output a blur signal "g" by removing geometric distortion from the image signal f_d using lens calibration data "α". For instance, the geometric compensator 21 may generate the blur signal "g" by performing bilinear interpolation on the image signal f_d. The lens calibration data "α" may be about the distortion rate of the lens 30. The lens calibration data "α" will be described with reference to FIGS. 4 and 5 below.

The image restoration block 23 may generate and output the restoration signal g' by restoring the blur signal "g" using the lens calibration data "α".

The memory 25 may store the lens calibration data "α". The memory 25 may be implemented by a volatile or non-volatile memory. The volatile memory may be any one of, but not limited to, a dynamic random access memory (DRAM), a static RAM (SRAM), a thyristor RAM (T-RAM), a zero capacitor RAM (Z-RAM), and a twin transistor RAM (TTRAM). The non-volatile memory may be any one of, but not limited to, an electrically erasable programmable read-only memory (EEPROM), a flash memory, a magnetic RAM (MRAM), a spin-transfer torque MRAM, a conductive bridging RAM (CBRAM), a ferro-electric RAM (FeRAM), a phase-change RAM (PRAM), a resistive RAM (RRAM), a nanotube RRAM, a polymer RAM (PoRAM), a nano floating gate memory (NFGM), a holographic memory, a molecular electronic memory device, an insulator resistance change memory.

The display device 40 may display the restoration signal g'. The display device 40 may be any device capable of outputting an image, including, but not limited to, a desktop computer, a cellular phone, and a tablet computer.

Figure 2:
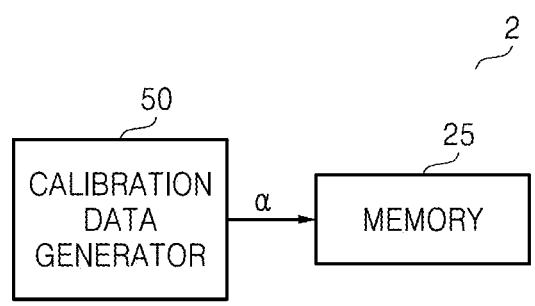
FIG. 2 is a block diagram of a lens calibration system, according to an example embodiment of inventive concepts.

FIG. 2 is a block diagram of a lens calibration system 2, according to an example embodiment of inventive concepts. Referring to FIGS. 1 and 2, the lens calibration system 2 may include the memory 25 and a calibration data generator 50. The calibration data generator 50 may be embedded within the image processor 20. Alternatively, the calibration data generator 50 may be a separate element in a wired and/or wireless communication with the image processor 20, using a known and/or to be developed wired/wireless communication means.

The calibration data generator 50 may generate and output the lens calibration data "α". The memory 25 may receive and store the lens calibration data "α". The calibration data generator 50 may be any one of, but not limited to, a personal computer (PC), a data server, a laptop computer, and a portable device. The calibration data generator 50 may be included in the image processing apparatus 1 or the image processor 20 in other embodiments.

The calibration data generator 50 may store the lens calibration data "α" in the memory 25 during the manufacturing of the image processor 20. The memory 25 may be a non-volatile memory.

In one example embodiment, the calibration data generator 50 may output the lens calibration data "α" to the memory 25 whenever power is supplied to the image processing apparatus 1. In this example embodiment, the memory 25 may be a non-volatile or volatile memory.

Figure 3:
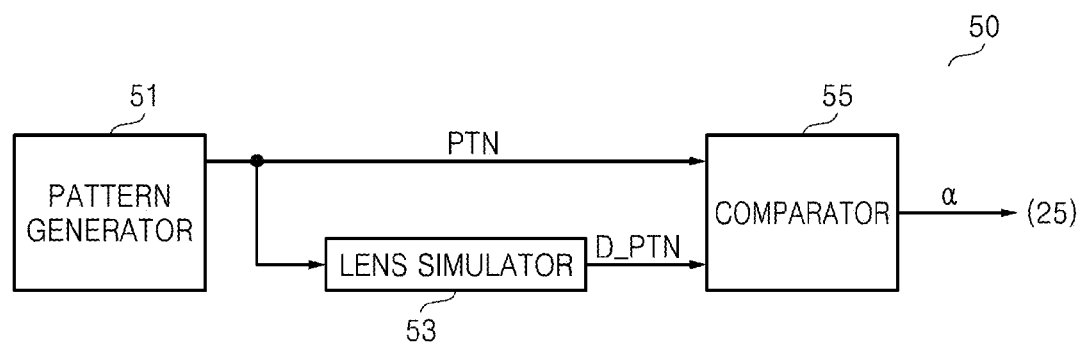
FIG. 3 is a detailed block diagram of a calibration data generator illustrated in FIG. 2, according to an example embodiment.

FIG. 3 is a detailed block diagram of the calibration data generator 50 illustrated in FIG. 2, according to an example embodiment. Referring to FIG. 3, the calibration data generator 50 may include a pattern generator 51, a lens simulator 53, and a comparator 55.

The pattern generator 51 may generate a pattern image PTN. The pattern image PTN may include "p" reference points (where "p" is an integer equal to or greater than 2) and the distances between the "p" reference points and the center of an image may be different from each other. The pattern image PTN may be a spiral pattern image, but inventive concepts are not restricted to the example embodiments.

The lens simulator 53 may simulate image pick-up of the lens 30 and distort the pattern image PTN geometrically. The lens simulator 53 may be implemented by a specific simulation program (e.g., code V), but inventive concepts are not restricted to the example embodiments.

The comparator 55 may compare the pattern image PTN with a distorted image D_PTN and generate the lens calibration data "α".

Figure 4:
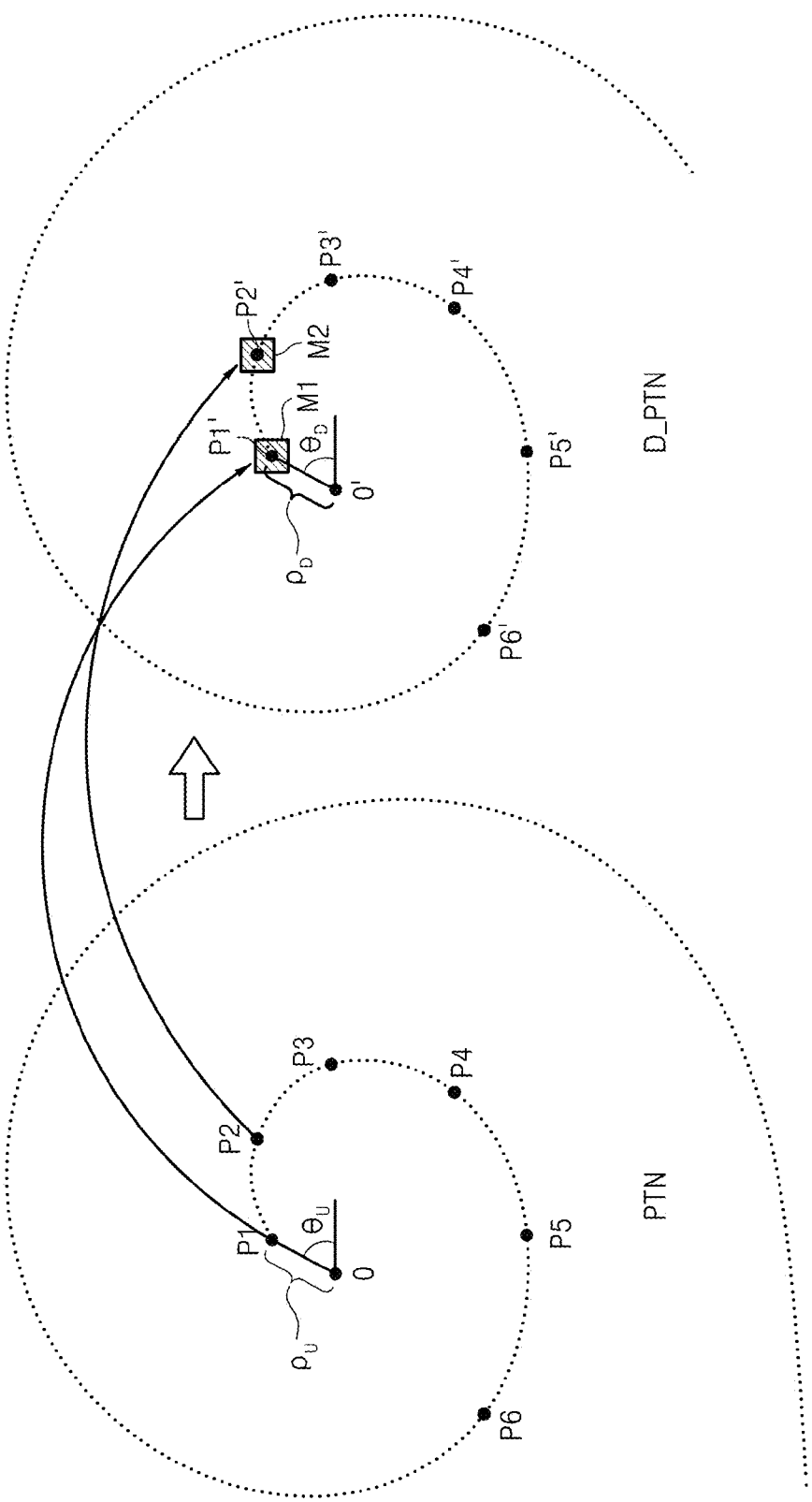
FIG. 4 is a diagram of the operation of a lens simulator illustrated in FIG. 3, according to an example embodiment.

FIG. 4 is a diagram of the operation of the lens simulator 53 illustrated in FIG. 3, according to an example embodiment. Referring to FIGS. 3 and 4, it is assumed that the number "p" of reference points is 6. P1 through P6 denote reference points for the pattern image PTN, P1' through P6' denote distortion points respectively corresponding to the reference points P1 through P6 in the distorted image D_PTN, O denotes the center of the pattern image PTN, and O' denotes the center of the distorted image D_PTN.

When the reference points P1 through P6 and the distortion points P1' through P6' are plotted in polar coordinate systems around the centers O and O', respectively, the relationship defined by Equation 1 may be established:

$$\rho_U \cos(\theta_U) \leftrightarrow \rho_D \cos(\theta_D), \quad (1)$$

where $(\rho_U, \theta_U)$ denotes the coordinates of each reference point (e.g., P1) in the polar coordinate system and $(\rho_D, \theta_D)$ denotes the coordinates of each distortion point (e.g., P1') in the polar coordinate system.

The correlation between the pattern image PTN and the distorted image D_PTN may be defined as Equation 2:

$$\rho_U = \rho_D(1+k\rho_D)$$

$$\theta_U = \theta_D \quad (2)$$

where "k" is a function of the length $\rho_U$ of the pattern image PTN. In other words, the angle $\theta_U$ in the pattern image PTN and the angle $\theta_D$ in the distorted image D_PTN may be the same as each other and the length $\rho_D$ of the distorted image D_PTN may vary with the value of the function "k".

The central part may expand and the periphery part may shrink and blur in the distorted image D_PTN as compared to the pattern image PTN. Accordingly, the brightness of the pattern image PTN at each reference point (e.g., P1) may be scattered around in a distortion mask M1 including the corresponding distortion point (e.g., P1').

In one example embodiment, the coordinates of the distortion points P1' through P6' are obtained in order to compare the reference points P1 through P6 with the distortion points P1' through P6'. The coordinates of each of the distortion points P1' through P6' may be obtained by calculating a weighted average of the coordinates of pixels within a corresponding one of distortion masks M1, M2, ... based on the brightness values of the respective pixels.

The distorted image D_PTN may include a plurality of the distortion masks M1, M2, ... having a predetermined size, e.g., M×N where M and N are integers equal to or greater than 2. For instance, when the distorted image D_PTN has 1000×1000 pixels and M=N=31, that is, a distortion mask has a size of 31×31; the distorted image D_PTN may include 970×970 different distortion masks.

The coordinates of respective pixels in each distortion mask may be weighted according to the brightness values of the respective pixels and then averaged to obtain a central coordinate of the distortion mask. The central coordinate may be obtained using Equation 3:

$$i = \frac{\sum_{n=1}^{N}\left[\sum_{m=1}^{N}\{B(m,n)\} \times n\right]}{\sum_{m=1}^{M}\{B(m,n)\}} \quad (3)$$

$$j = \frac{\sum_{m=1}^{M}\left[\sum_{n=1}^{N}\{B(m,n)\} \times m\right]}{\sum_{n=1}^{N}\{B(m,n)\}},$$

where "i" and "j" respectively denote horizontal and vertical coordinates in the central coordinate, "m" and "n" respectively denote horizontal and vertical coordinates reset in the mask, and B denotes the brightness value of a pixel at a coordinate (m, n) in the mask.

Except for a case where all pixels in a distortion mask are dark, central coordinates as many as the number "p" of the reference points P1 through P6 are calculated for respective distortion masks. The central coordinates of the respective distortion masks respectively become the distortion points P1' through P6'. Accordingly, a $q^{th}$ (where "q" is an integer ranging from 1 to "p") reference point, which is $q^{th}$ closest to the center O of the pattern image PTN, may correspond to a $q^{th}$ distortion point, which is $q^{th}$ closest to the center O' of the distorted image D_PTN.

Figure 5:
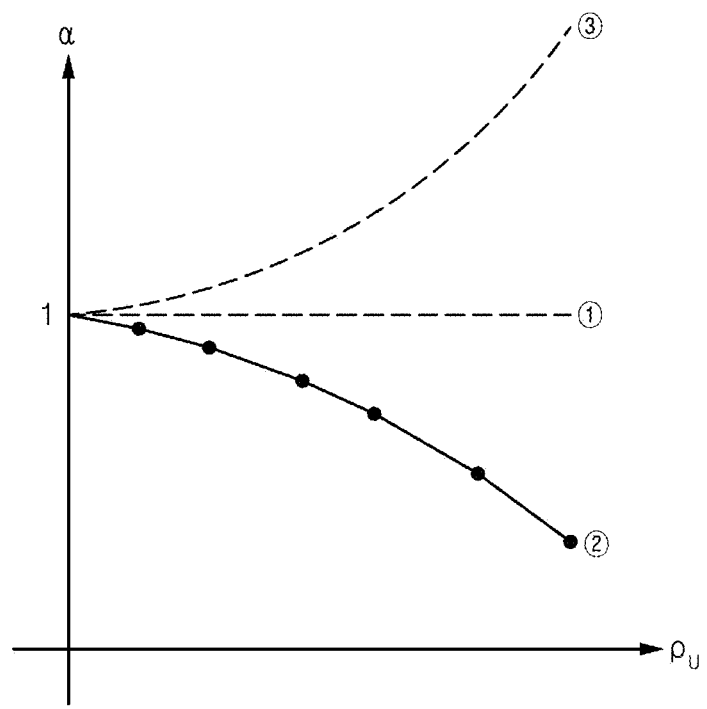
FIG. 5 is a graph showing the distortion rate of a lens with respect to the distance between a reference point and a center of a pattern image, according to an example embodiment.

FIG. 5 is a graph showing the distortion rate of a lens with respect to the distance between a reference point and a center of a pattern image, according to an example embodiment. Referring to FIGS. 3 and 5, the comparator 55 may generate the lens calibration data "α" by calculating a ratio between the distance $\rho_U$ between the center O of the pattern image PTN and each of the reference points P1 through P6 and the distance $\rho_D$ between the center O' of the distorted image D_PTN and a corresponding one of the distortion points P1' through P6'. The lens calibration data "α" may be the distortion rate of the lens and may be obtained using Equation 4:

$$\alpha = \frac{\rho_D}{\rho_U}. \quad (4)$$

In one example embodiment, when α=1 (①), the distorted image D_PTN is the same as the pattern image PTN. However, the more "α" deviates from 1 (② and ③), the more the distorted image D_PTN is distorted from the pattern image PTN. The lens calibration data "α" may be discrete data having as many values as the number of the reference points P1 through P6. The comparator 55 may perform linear interpolation on the values of the lens calibration data "α" before outputting the lens calibration data "α".

Figure 6:
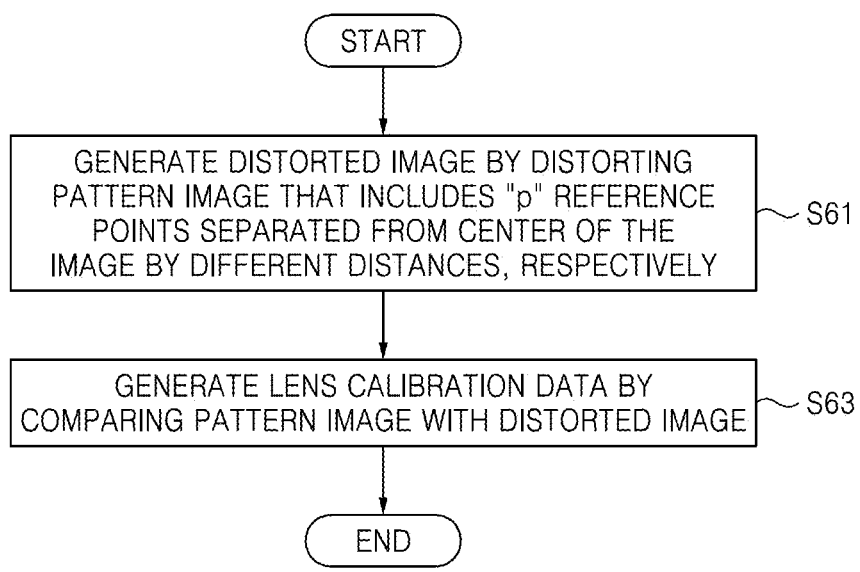
FIG. 6 is a flowchart of a lens calibration method, according to an example embodiment of inventive concepts.

FIG. 6 is a flowchart of a lens calibration method according to an example embodiment of inventive concepts. The lens calibration method illustrated in FIG. 6 may be performed by the calibration data generator 50 illustrated in FIG. 3.

Referring to FIGS. 3 and 6, the lens simulator 53 may distort the pattern image PTN that includes "p" reference points separated from the center of the pattern image PTN by different distances, respectively, at S61. The comparator 55 compares the pattern image PTN with the distorted image D_PTN and generates the lens calibration data "α" at S63.

Figure 7:
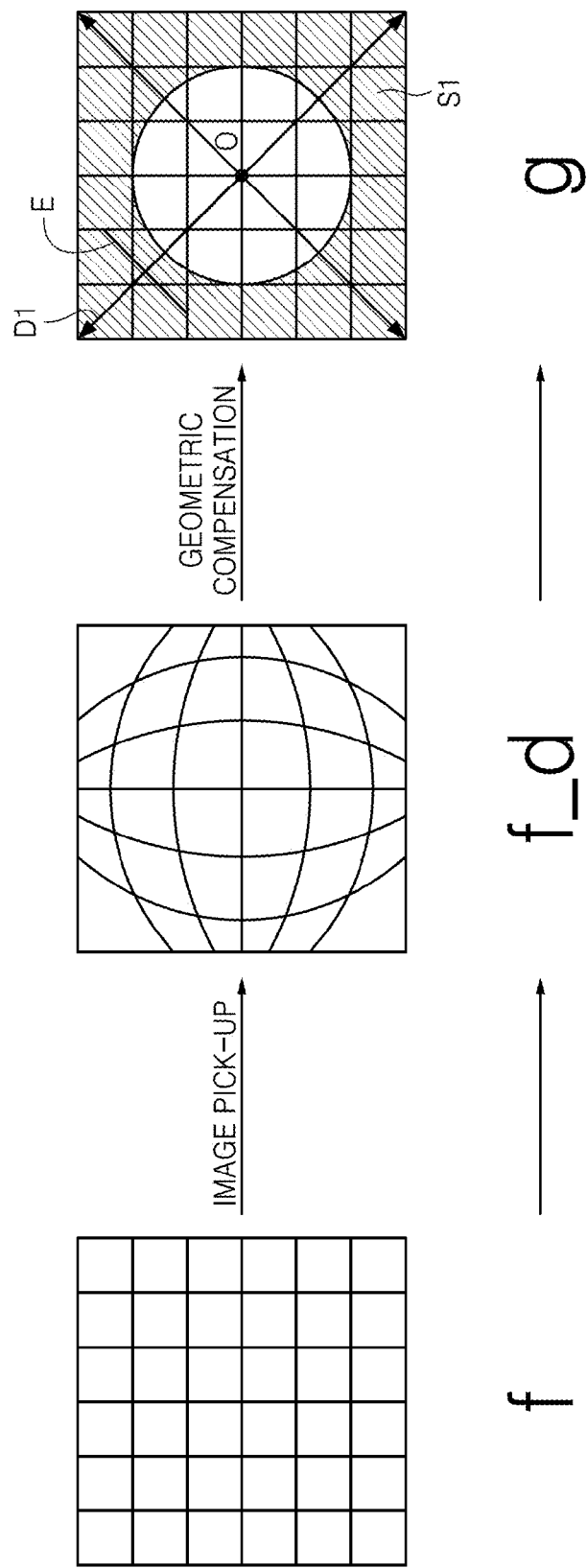
FIG. 7 is a diagram illustrating an original image, an image distorted by a lens, and an image blurred by geometrical compensation, according to an example embodiment.

FIG. 7 is a diagram illustrating an original image "f", an image f_d distorted by a lens, and an image "g" blurred by geometrical compensation, according to an example embodiment. Referring to FIGS. 1 and 7, the image f_d included in the image signal f_d picked up and generated through the lens 30 may have geometric distortion as compared to the original image "f".

The geometric compensator 21 generates the blur image "g" by removing the geometric distortion from the distorted image f_d. Accordingly, a blur occurs in a diagonal direction D1 from the center O of the blur image "g". The blur may be worst in a periphery region S1 far from the center O of the blur image "g". For instance, when the border of objects included in the original image "f" is in a normal direction E to the diagonal direction D1, the border blurs in the blur image "g".

Figure 8:
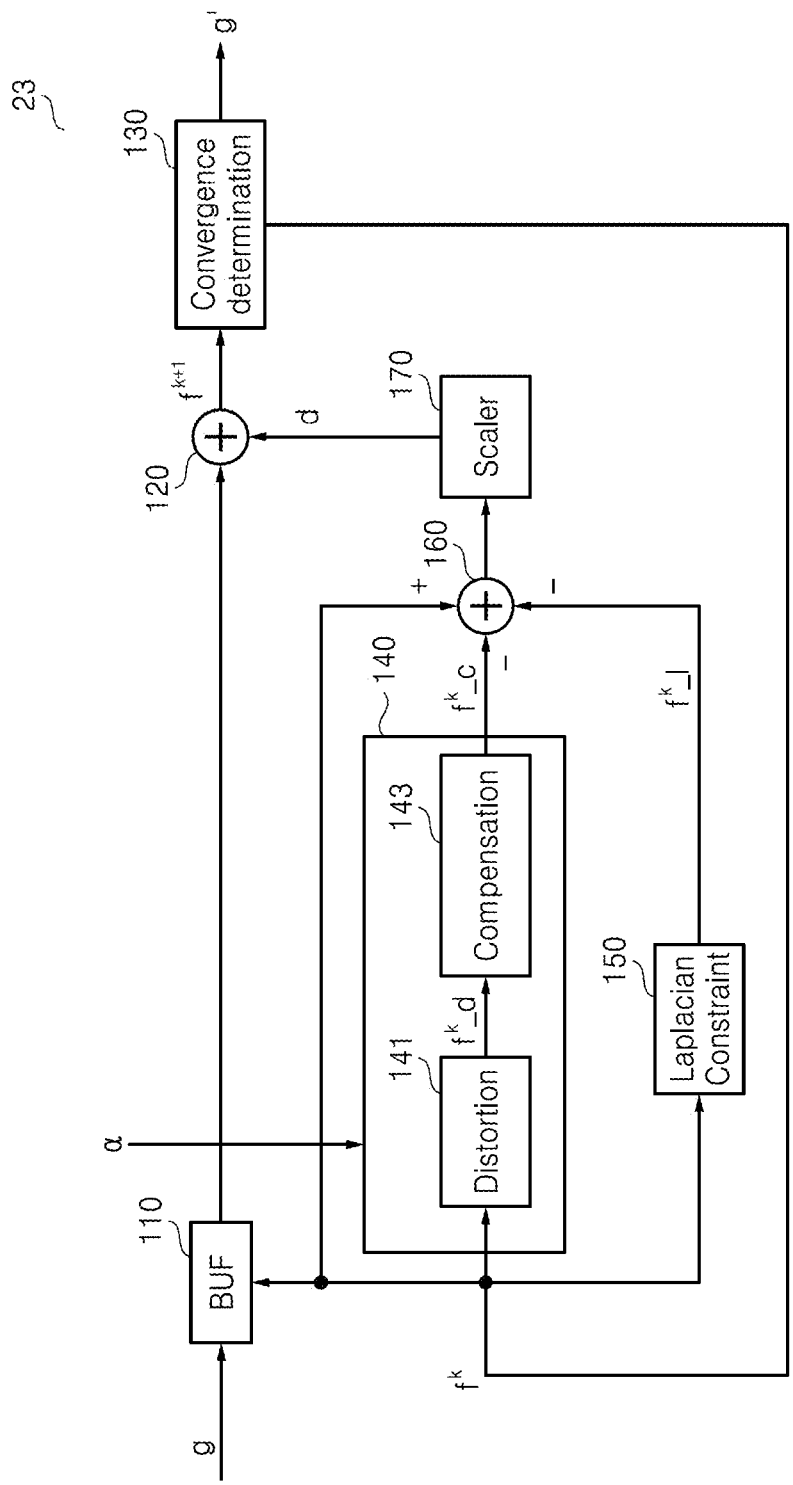
FIG. 8 is a detailed block diagram of an image restoration block illustrated in FIG. 1, according to an example embodiment.

FIG. 8 is a detailed block diagram of the image restoration block 23 illustrated in FIG. 1, according to an example embodiment. Referring to FIGS. 1 and 8, the image restoration block 23 may include a buffer 110, a first operation unit 120, a convergence determination unit 130, a degrader 140, a Laplacian filter 150, a second operation unit 160, and a scalar 170. The operations of the image restoration block 23 will be described chronologically.

The buffer 110 may receive and store the blur image (referred to as an input image) "g" and may output it to the first operation unit 120. The first operation unit 120 may output the input image "g" to the convergence determination unit 130. The convergence determination unit 130 may store the input image "g" as a zeroth-order processed image $f^0$ and outputs the zeroth-order processed image $f^0$ to the buffer 110, the degrader 140, and the Laplacian filter 150. The buffer 110 may receive and store the zeroth-order processed image $f^0$. Accordingly, the buffer 110 may erase an image that has been stored previously.

The degrader 140 may generate a first-order degraded image $f^1\_c$ by degrading the zeroth-order processed image $f^0$ using the lens calibration data "α" and may output the first-order degraded image $f^1\_c$ to the second operation unit 160. The degrader 140 may include a distortion unit 141 and a compensation unit 143.

The distortion unit 141 may generate a first-order distorted image $f^1\_d$ by distorting the zeroth-order processed image $f^0$ based on the lens calibration data "α". The lens calibration data "α" may be generated by the calibration data generator 50 illustrated in FIG. 3. The distortion by the distortion unit 141 may correspond to the distortion by the lens 30. The operation of the distortion unit 141 will be described in detail below, with reference to FIGS. 9 through 12.

The compensation unit 143 generates the first-order degraded image $f^1\_c$ by compensating the first-order distorted image $f^1\_d$. The compensation unit 143 may compensate the first-order distorted image $f^1\_d$ using, for example, the bilinear interpolation. The structure and the function of the compensation unit 143 may be the same as those of the geometric compensator 21.

The Laplacian filter 150 may generate a first-order filtered image $f^1\_1$ by performing Laplacian filtering on the zeroth-order processed image $f^0$. The second operation unit 160 may subtract the first-order degraded image $f^1\_c$ and the first-order filtered image $f^1\_1$ from the zeroth-order processed image $f^0$ and may output a result of the subtraction.

The scalar 170 may generate a deducted image "d" by scaling the subtraction result by β times. Here, β is a roll-off factor and may be a predetermined value ranging from 0 to 1.

The first operation unit 120 may output a first-order processed image $f^1$ by subtracting the deducted image "d" from the zeroth-order processed image $f^0$ received from the buffer 110. The convergence determination unit 130 may determine whether the first-order processed image $f^1$ converges to the zeroth-order processed image $f^0$ that has been stored in the convergence determination unit 130. In one example embodiment, the convergence determination unit 130 may receive the deducted image "d" from the scalar 170 and determine whether the deducted image "d" satisfies a desired condition, for example, whether the deducted image "d" converges to 0.

In one example embodiment, when the first-order processed image $f^1$ converges to the zeroth-order processed image $f^0$, the convergence determination unit 130 outputs the first-order processed image $f^1$ as a restored image g'. When the first-order processed image $f^1$ does not converge to the zeroth-order processed image $f^0$, the convergence determination unit 130 stores the first-order processed image $f^1$ and outputs the first-order processed image $f^1$ to the buffer 110, the degrader 140, and the Laplacian filter 150.

The above-described operations may be repeated until a $(k+1)^{th}$ order processed image $f^{k+1}$ converges to a $k^{th}$-order processed image $f^k$ where "k" is a natural number.

Figure 9:
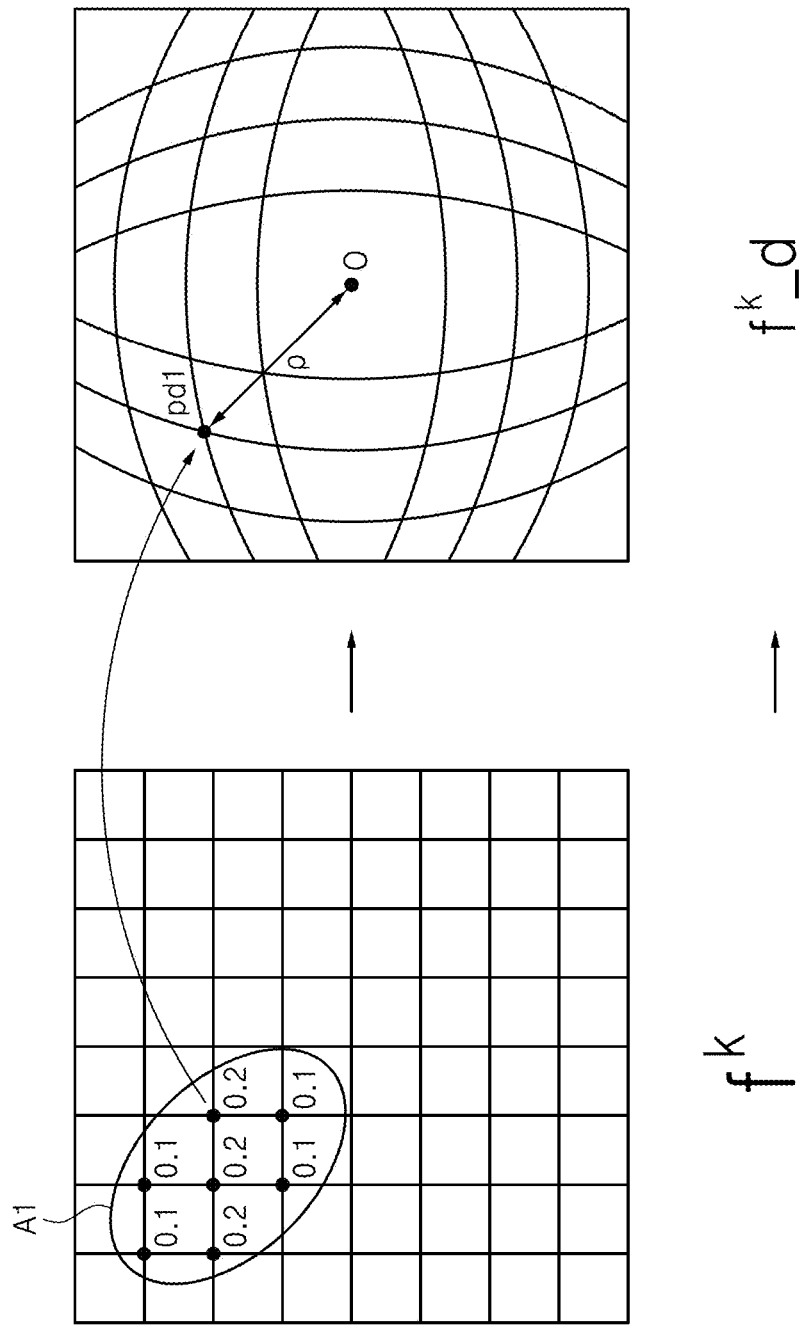
FIG. 9 is a diagram illustrating the operation of a distortion unit illustrated in FIG. 8, according to an example embodiment.

FIG. 9 is a diagram illustrating the operation of the distortion unit 141 illustrated in FIG. 8, according to an example embodiment. Referring to FIGS. 8 and 9, the distortion unit 141 may distort the $k^{th}$-order processed image $f^k$ based on the lens calibration data "α" to generate a $k^{th}$-order distorted image $f^k\_d$. The distortion unit 141 may obtain the brightness value of a pixel, e.g., pd1, in the $k^{th}$-order distorted image $f^k\_d$ by calculating a weighted average of brightness values of pixels in a certain region (hereinafter referred to as a "weighted averaging region") A1 in the $k^{th}$-order processed image $f^k$ based on weights.

The distortion unit 141 may obtain the weighted averaging region A1 and the weights using a raised cosine filter. The raised cosine filter may be a function of a distance "ρ" of the pixel pd1 from the image center O. For instance, when the $k^{th}$-order distorted image $f^k\_d$ includes 1000×1000 pixels and the brightness of a pixel at a position (1, 1) in the $k^{th}$-order distorted image $f^k\_d$ is obtained, the distance "ρ" may be obtained since the image center O is a pixel at a position (500, 500). Accordingly, the weighted averaging region A1 around the position (1, 1) in the $k^{th}$-order processed image $f^k$ may be obtained using the raised cosine filter and the brightness of the pixel at the position (1, 1) in the $k^{th}$-order distorted image $f^k\_d$ maybe obtained by calculating a weighted average of the brightness values of pixels in the weighted averaging region A1.

Figure 10:
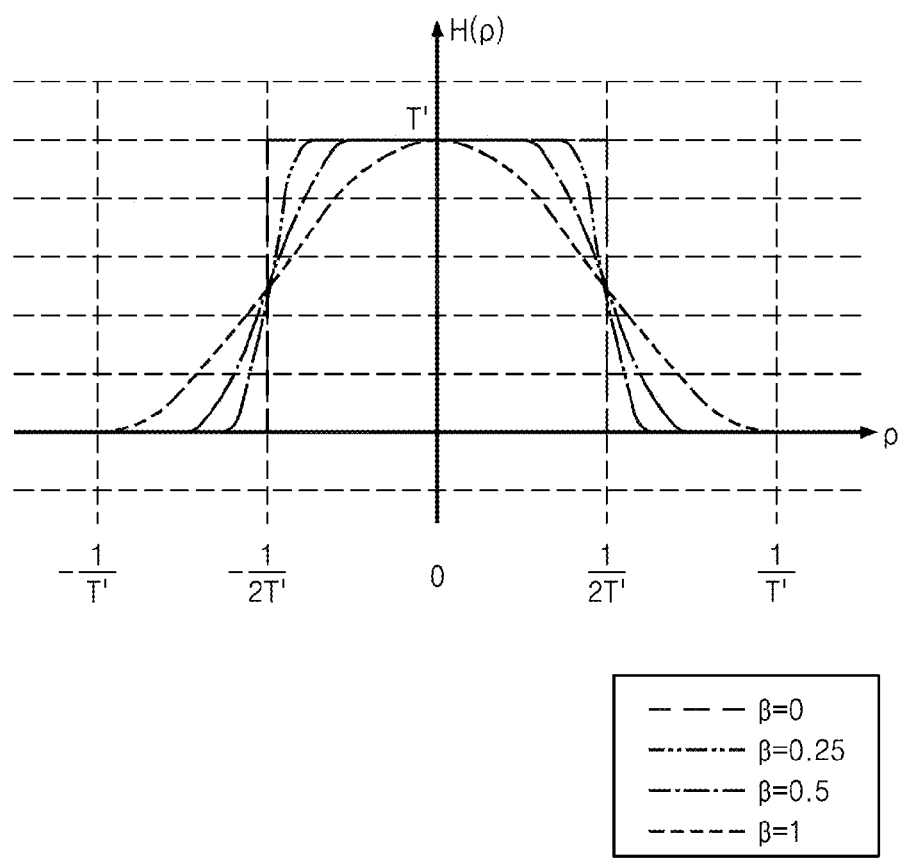
FIG. 10 is a graph showing a probability function with respect to a raised cosine filter, according to an example embodiment.

FIG. 10 is a graph showing a probability function H(ρ) with respect to the raised cosine filter, according to an example embodiment. Referring to FIGS. 9 and 10, a weight H is a probability function of the distance "ρ" and has a sum total of 1. The shape of the graph may vary with the roll-off factor β. The probability function H(ρ) may be obtained using Equation 5:

$$H(\rho) = \begin{cases} T', & |\rho'| \le \frac{1-\beta}{2T'} \\ \frac{T'}{2}\left[1 + \cos\left(\frac{\pi T'}{\beta}\left[|\rho'| - \frac{1-\beta}{2T'}\right]\right)\right], & \frac{1-\beta}{2T'} < |\rho'| \le \frac{1+\beta}{2T'} \\ 0, & \text{otherwise} \end{cases} \quad (5)$$

where T is the radius of the filter. When T=T' and ρ=ρ', Equation 5 becomes an equation for the normal raised cosine filter.

In the current embodiments, the normal raised cosine filter is distorted using Equation 6:

$$T' = T \cdot \alpha(\rho) \text{ and } \rho' = \rho \cdot \alpha(\rho) \quad (6)$$

Figure 11:
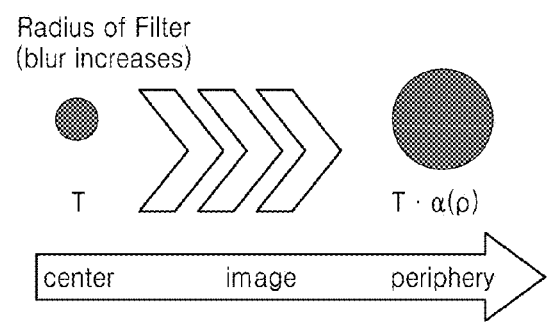
FIG. 11 is a diagram illustrating the change in the radius of a filter based on the distortion of the probability function, according to an example embodiment.
Figure 12:
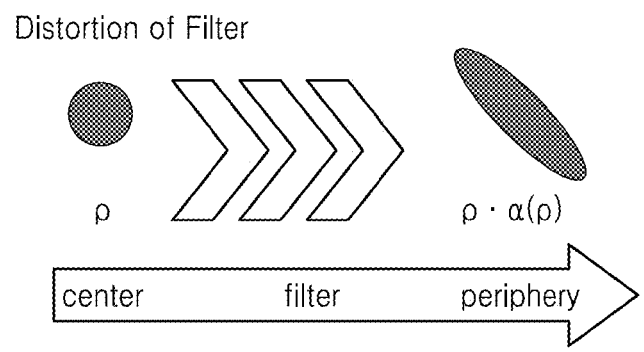
FIG. 12 is a diagram illustrating the distortion in a filter based on the distortion of the probability function, according to an example embodiment.

FIG. 11 is a diagram illustrating a change in the radius of the filter based on the distortion of the probability function H(ρ), according to an example embodiment. FIG. 12 is a diagram illustrating the distortion in the filter based on the distortion of the probability function H(ρ), according to an example embodiment.

Referring to FIG. 11, the size of the filter may increase as the distance between the position of the filter and the center of an image increases due to the distortion of Equation 6. As the size of the filter increases, a blur may also increase.

Referring to FIG. 12, the shape of the filter may be distorted from a circular shape to an oval shape as the distance between the position of the filter and the center of an image increases due to the distortion of Equation 6.

Figure 13:
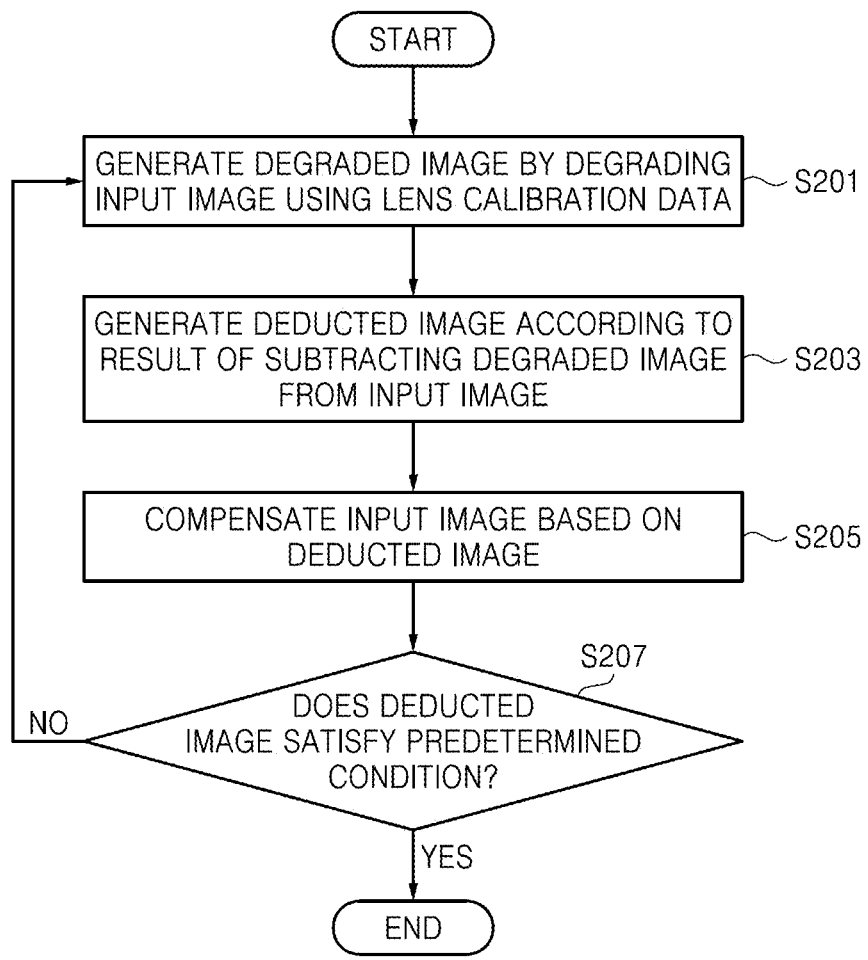
FIG. 13 is a flowchart of an image restoration method, according to an example embodiment of inventive concepts.

FIG. 13 is a flowchart of an image restoration method, according to an example embodiment of inventive concepts.

The image restoration method illustrated in FIG. 13 may be performed by the image restoration block 23 illustrated in FIG. 8.

Referring to FIGS. 8 and 13, the degrader 140 may degrade the input image "g" using the lens calibration data "α" and may generate a degraded image $f^k\_c$, at S201. The second operation unit 160 and the scalar 170 may generate the deducted image "d" according to a result of subtracting the degraded image $f^k\_c$ from the input image "g", at S203.

The first operation unit 120 may compensate the input image "g" based on the deducted image "d", at S205. The convergence determination unit 130 may determine whether the deducted image "d" satisfies a desired condition, at S207, such as the desired condition, described above. When the deducted image "d" does not satisfy the desired condition, the method reverts back to S201 and S201 through S205 are repeatedly performed on the compensated input image $f^k$. When the deducted image "d" satisfies the desired condition, the compensated input image $f^k$ is outputted as the restored image "g".

Figure 14:
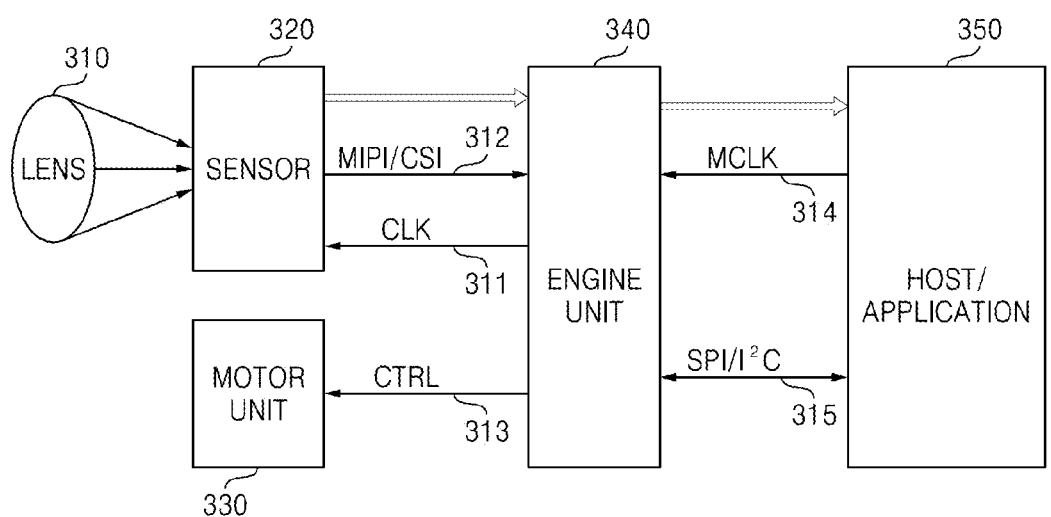
FIG. 14 is a block diagram of a camera system, according to an example embodiment of inventive concepts.

FIG. 14 is a block diagram of a camera system 300, according to an example embodiment of inventive concepts. The camera system 300 may include a digital camera.

Referring to FIG. 14, the camera system 300 may include a lens 310, an image sensor 320, a motor unit 330, and an engine unit 340. Accordingly, the image sensor 320 may include the image sensor 10 and the image processor 20 illustrated in FIG. 1.

The lens 310 focuses incident light onto a light receiving area (e.g., a photodiode) in the image sensor 320. The image sensor 320 generates image data based on the incident light received through the lens 310. The image sensor 320 may provide the image data based on a clock signal CLK 311. The image sensor 320 may interface with the engine unit 340 using a mobile industry processor interface (MIPI) 312 and/or a camera serial interface (CSI) 312. The motor unit 330 may adjust the focus of the lens 310 or perform shuttering in response to a control signal CTRL 313 received from the engine unit 340.

The engine unit 340 may control the image sensor 320 and the motor unit 330. The engine unit 340 may generate YUV data, which includes a distance to an object, a luminance component, a difference between the luminance component and a blue component, and a difference between the luminance component and a red component, or compressed data, e.g., Joint Photography Experts Group (JPEG) data, based on distance and/or image data received from the image sensor 320. The engine unit 340 may be connected to a host/application 350 and may provide the YUV data or JPEG data to the host/application 350 according to a master clock signal MCLK 314. In addition, the engine unit 340 may interface with the host/application 350 using a serial peripheral interface (SPI) and/or an inter integrated circuit ($I^2C$) 315.

Figure 15:
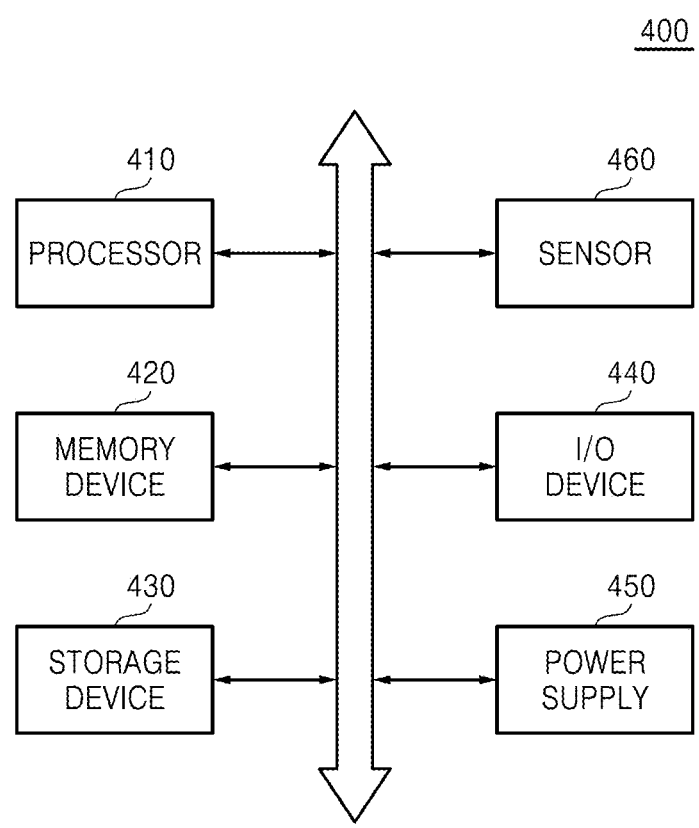
FIG. 15 is a block diagram of a computing system, according to an example embodiment of inventive concepts.

FIG. 15 is a block diagram of a computing system 400, according to an example embodiment of inventive concepts. Referring to FIG. 15, the computing system 400 may include a processor 410, a memory device 420, a storage device 430, an input/output (I/O) device 440, a power supply 450, and an image sensor 460. In one example embodiment, the image sensor 460 may include the image sensor 10 and the image processor 20 illustrated in FIG. 1. Although not shown in FIG. 15, the computing system 400 may also include ports that may communicate with any one of, but not limited to, video cards, sound cards, memory cards, universal serial bus (USB) devices, and other electronic devices.

The processor 410 may perform particular calculations or tasks. The processor 410 may be a microprocessor or a central processing unit (CPU). The processor 410 may communicate with the memory device 420, the storage device 430, and the I/O device 440 through any one of, but not limited to, an address bus, a control bus, and a data bus. The processor 410 may also be connected to an extended bus such as a peripheral component interconnect (PCI) bus.

The memory device 420 may store data necessary for the operations of the computing system 400. The memory device 420 may be implemented by DRAM, mobile DRAM, SRAM, PRAM, FeRAM, RRAM, and/or MRAM. The storage device 430 may include a solid state drive (SSD), a hard disk drive (HDD), and a compact disk-read only memory (CD-ROM).

The I/O device 440 may include an input device such as a keyboard, a keypad, or a mouse and an output device such as a printer or a display. The power supply 450 may provide an operating voltage necessary for the operation of the computing system 400.

The image sensor 460 may communicate with the processor 410 through buses or other communication links. The image sensor 460 and the processor 410 may be integrated together into a single chip or may be separately integrated into different chips, respectively.

The computing system 400 may be any type of computing system using the image sensor 460. For instance, the computing system 400 may be any one of, but not limited to, a digital camera, a mobile phone, a personal digital assistant (PDA), a portable multimedia player (PMP), and a smart phone.

Figure 16:
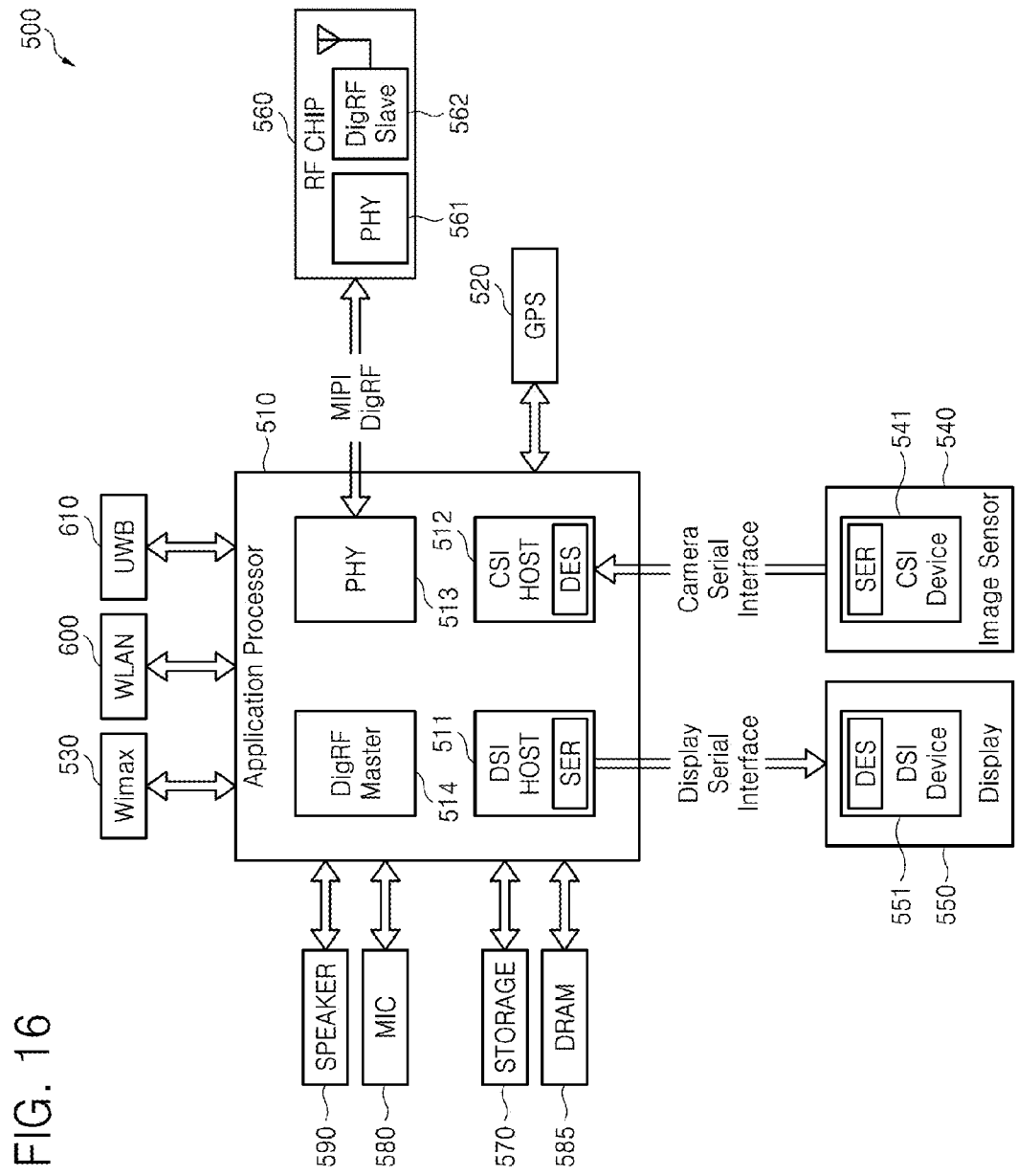
FIG. 16 is a block diagram of an interface used in the computing system illustrated in FIG. 15, according to an example embodiment.

FIG. 16 is a block diagram of an interface used in the computing system illustrated in FIG. 15, according to an example embodiment. Referring to FIG. 16, the computing system 500 may be implemented by a data processing apparatus that may use or support the MIPI interface. The computing system 500 may include an application processor 510, an image sensor 540, and a display 550.

A camera serial interface (CSI) host 512 included in the application processor 510 may perform serial communication with a CSI device 541 included in the image sensor 540 through CSI. For example, an optical de-serializer (DES) may be implemented in the CSI host 512, and an optical serializer (SER) may be implemented in the CSI device 541. The image sensor 540 may include the image sensor 10 and the image processor 20 illustrated in FIG. 1.

A display serial interface (DSI) host 511 included in the application processor 510 may perform serial communication with a DSI device 551 included in the display 550 through DSI. For example, an optical serializer may be implemented in the DSI host 511, and an optical de-serializer may be implemented in the DSI device 551.

In one example embodiment, the computing system 500 may also include a radio frequency (RF) chip 560 which communicates with the application processor 510. A physical layer (PHY) 513 of the computing system 500 and a PHY 561 of the RF chip 560 may communicate data with each other according to, for example, a MIPI DigRF standard. Furthermore, the application processor 510 may further include a DigRF MASTER 514 for controlling data communication, according to the MIPI DigRF standard.

In one example embodiment, the computing system 500 may further include at least one element from among a GPS 520, a storage device 570, a microphone 580, a DRAM 585 and a speaker 590. The computing system 500 may communicate using any one of an Ultra Wideband (UWB) 610, a Wireless Local Area Network (WLAN) 600, and a Worldwide Interoperability for Microwave Access (WIMAX) 530. The structure and interface of the computing system 500 are exemplary, but inventive concepts are not restricted to the example embodiments.

Inventive concepts described above, may also be embodied as computer-readable codes on a computer-readable medium. The computer-readable recording medium may any data storage device that may store data as a program and/or computer-readable instructions which may thereafter be read by a computer system. Examples of the computer-readable recording medium include a read-only memory (ROM), a random-access memory (RAM), CD-ROMs, magnetic tapes, floppy disks, and optical data storage devices.

The computer-readable recording medium may also be distributed over network coupled computer systems so that the computer-readable code is stored and executed in a distributed fashion. Also, functional programs, codes, and code segments the inventive concepts may be easily construed by programmers.

As described above, according to some embodiments of inventive concepts, a spiral pattern is used, so that lens calibration maybe performed with a relatively small amount of computation and/or at high accuracy. In addition, an image may be restored based on a degraded model using lens calibration data, so that a blur may be reduced in the image.

While inventive concepts have been particularly shown and described with reference to exemplary embodiments thereof, it will be understood by those of ordinary skill in the art that various changes in forms and details may be made therein without departing from the spirit and scope of inventive concepts as defined by the following claims.

What is claimed is:

1. An image restoration method, comprising:
generating a degraded image by degrading an input image using lens calibration data and a raised cosine filter;
generating a deducted image according to a result of subtracting the degraded image from the input image; and
adjusting the input image based on the deducted image, wherein the raised cosine filter is a function of a distance of a pixel from a center of the input image.

2. The image restoration method of claim 1, further comprising:
repeatedly performing the generating the degraded image, the generating the deducted image, and the adjusting the input image until the adjusted input image satisfies a desired condition.

3. The image restoration method of claim 1, wherein the generating the degraded image comprises:
generating a distorted image by distorting the input image using the lens calibration data; and
generating the degraded image by compensating the distorted image.

4. The image restoration method of claim 3, wherein the generating the distorted image is performed using the raised cosine filter.

5. The image restoration method of claim 4, wherein the raised cosine filter has a function $$H(\rho) = \begin{cases} T', & |\rho'| \leq \frac{1-\beta}{2T'} \\ \frac{T'}{2}\left[1 + \cos\left(\frac{\pi T'}{\beta}\left[|\rho'| - \frac{1-\beta}{2T'}\right]\right)\right], & \frac{1-\beta}{2T'} < |\rho'| \leq \frac{1+\beta}{2T'}, \\ 0, & \text{otherwise} \end{cases}$$

where $T'=T\cdot\alpha(\rho)$ and $\rho'=\rho\cdot\alpha(\rho)$, T is a radius of the raised cosine filter, $\rho$ is a distance from the center of the input image, $\alpha$ is the lens calibration data, and $\beta$ is a desired value ranging from 0 to 1.

6. The image restoration method of claim 1, wherein the generating the deducted image comprises:
generating a filtered image by performing a Laplacian filtering of the input image;
subtracting the degraded image and the filtered image from the input image; and
generating the deducted image by scaling a result of the subtracting the degraded image and the filtered image from the input image.

7. The image restoration method of claim 1, wherein the lens calibration data is generated by distorting a spiral pattern image and comparing the spiral pattern image with a distorted image.

8. The image restoration method of claim 1, wherein the input image is an image that is captured through a fisheye lens and is geometrically compensated.

9. A method comprising:
generating a lens calibration data based on comparing a pattern image and a distorted image of the pattern image;
generating a degraded image based on an input image and the lens calibration data and a raised cosine filter;
generating a deducted image using the degraded image and the input image;
adjusting the input image based on the deducted image; and
determining whether the adjusted input image satisfied a desired condition,
wherein the raised cosine filter is a function of a distance of a pixel from a center of the input image.

10. The method of claim 9, wherein the pattern image is a first spiral pattern image comprising at least two reference points, and the distorted image is a second spiral pattern comprising at least two distortion points, each of the at least two distortion points corresponding to one of the at least two reference points.

11. The method of claim 9, wherein the comparing comprises:
calculating a ratio between a first distance and a second distance, the first distance being a distance between a center of the pattern image and a corresponding coordinate of the at least two reference points and the second distance being a distance between a center of the distorted image and a corresponding coordinate of one of the at least two distortion points.

12. The method of claim 9, wherein the generating the degraded image comprises:
distorting the input image using the lens calibration data; and
compensating the distorted image using an interpolation method.

13. The method of claim 9, wherein the generating the deducted image comprises:
generating a filtered image by performing a Laplacian filtering of the input image;
subtracting the degraded image and the filtered image from the input image; and
generating the deducted image by scaling a result of the subtracting the degraded image and the filtered image from the input image.

14. The method of claim 9, wherein the adjusting comprises:
subtracting the deducted image from the input image.

15. The method of claim 9, wherein the desired condition is a convergence of the adjusted input image to the input image.

* * * * *